(12) United States Patent
Whitmarsh et al.

(10) Patent No.: US 7,042,585 B1
(45) Date of Patent: May 9, 2006

(54) INTERNET PRINT BROKERING SYSTEM AND METHOD

(75) Inventors: Michael Dean Whitmarsh, Vancouver, WA (US); Andrew Franklin Seaborne, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 881 days.

(21) Appl. No.: 09/686,849

(22) Filed: Oct. 10, 2000

(51) Int. Cl.
*G06F 15/00* (2006.01)

(52) U.S. Cl. .................................. 358/1.15; 358/1.13

(58) Field of Classification Search ............... 358/1.5, 358/1.12, 1.13, 1.14, 1.15, 1.16, 400, 1.1, 358/1.18, 1.11
See application file for complete search history.

(56) References Cited

U.S. PATENT DOCUMENTS

| | | | |
|---|---|---|---|
| 5,467,434 A * | 11/1995 | Hower et al. | 358/1.15 |
| 5,970,475 A | 10/1999 | Barnes et al. | 705/27 |
| 6,064,838 A * | 5/2000 | Maruta et al. | 399/79 |
| 6,335,795 B1 * | 1/2002 | Neuhard et al. | 358/1.15 |
| 6,452,692 B1 * | 9/2002 | Yacoub | 358/1.15 |
| 6,476,927 B1 * | 11/2002 | Schwarz, Jr. | 358/1.15 |

FOREIGN PATENT DOCUMENTS

| | | |
|---|---|---|
| EP | 0917043 A | 5/1999 |
| JP | 11154218 | 6/1999 |
| WO | WO 99/38068 | 7/1999 |
| WO | WO 00/03342 | 1/2000 |

OTHER PUBLICATIONS

European Search Report. EP 01109939. Patent application filed Apr. 24, 2001. Report issued Aug. 12, 2005 at The Hague.

* cited by examiner

*Primary Examiner*—Mark Wallerson

(57) ABSTRACT

A system and method of brokering a print job between a customer and a plurality of print providers includes defining a network communication link between the customer and a print brokering system controller having a printing capability of each of the print providers registered therewith. The print brokering system controller compares a print request for the print job with the printing capability of each of the print providers and determines which of the print providers have the printing capability to fulfill the print request. As such, the print brokering system controller compiles a list of the print providers which have the printing capability to fulfill the print request.

38 Claims, 8 Drawing Sheets

INTERNET PRINT BROKERING SYSTEM AND METHOD

CROSS-REFERENCE TO RELATED APPLICATIONS

This patent application is related to Non-Provisional U.S. patent application Ser. No. 09/685,847, entitled "INTERNET PRINT MANAGING SYSTEM AND METHOD WITH PRINT JOB DISTRIBUTION", filed on even date herewith, assigned to the assignee of the present invention, and incorporated herein by reference.

THE FIELD OF THE INVENTION

The present invention relates generally to print services and, more particularly, to an Internet system and method of brokering a print job between a customer and a plurality of print providers each providing print services.

BACKGROUND OF THE INVENTION

Typically, a party having printing needs must either fulfill the printing needs on their own or contract with a print provider offering printing services which can fulfill the printing needs. Before contracting with a print provider, however, a customer must identify which print providers offer specific printing services which fulfill the printing needs. Identifying which print providers of a myriad of available print providers provide specific printing services is a tedious task. More specifically, the customer must contact each print provider individually, either in person or telephonically, to identify which print providers provide specific printing services.

While identifying which print providers provide specific printing services, the customer also must identify which print providers provide specific printing services within desired or necessary parameters. The customer may require, for example, that a print job be completed and delivered within a certain time frame or that a print job be completed for less than a specific price. Thus, a customer may need to contact several print providers individually to identify which print providers provide specific printing services within desired or necessary parameters.

Unfortunately, contacting several print providers individually to identify which print providers provide specific printing services within desired or necessary parameters is often ineffective and inefficient. After contacting several print providers, for example, the customer may find that the print providers do not provide the specific printing services or that the print providers do not provide the specific printing services within the desired or necessary parameters. Thus, efforts of the customer may identify few or no print providers capable of fulfilling the print job.

Accordingly, a need exists for efficiently and effectively brokering a print job between a customer and a plurality of print providers. More specifically, a need exists for uniting a customer having printing needs with print providers providing print services which can fulfill the printing needs.

SUMMARY OF THE INVENTION

One aspect of the present invention provides a method of brokering a print job between a customer and a plurality of print providers. The method includes providing a print brokering system controller having a printing capability of each of the print providers registered therewith, defining a network communication link between the customer and the print brokering system controller, comparing a print request for the print job with the printing capability of each of the print providers and determining which of the print providers have the printing capability to fulfill the print request, and compiling a list of at least one of the print providers which has the printing capability to fulfill the print request.

Another aspect of the present invention provides a system for brokering a print job between a customer and a plurality of print providers. The system includes a print brokering system controller configured to have a printing capability of the print providers registered therewith such that the print brokering system controller is adapted to receive a print request for the print job and compare the print request with the printing capability of the print providers to determine which of the print providers have the printing capability to fulfill the print request. As such, the print brokering system controller is adapted to compile a list of at least one of the print providers which has the printing capability to fulfill the print request.

Another aspect of the present invention provides a method of brokering a print job between a customer and a plurality of print providers. The method includes providing a print brokering system controller having a printing capability of the print providers registered therewith and generating and submitting a print request for the print job to the print brokering system controller. The method also includes comparing the print request with the printing capability of at least one of the print providers and determining if the at least one of the print providers has the printing capability to fulfill the print request, and compiling a list of the at least one of the print providers if the at least one of the print providers has the printing capability to fulfill the print request.

In one embodiment, the present invention provides a system and method of brokering a print job of a customer between the customer and a plurality of print providers each providing print services. The system and method utilizes a network communication link between the customer, the print providers, and a controller of the system so as to effectively and efficiently unite customers having printing needs with print providers providing print services which can fulfill the printing needs.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
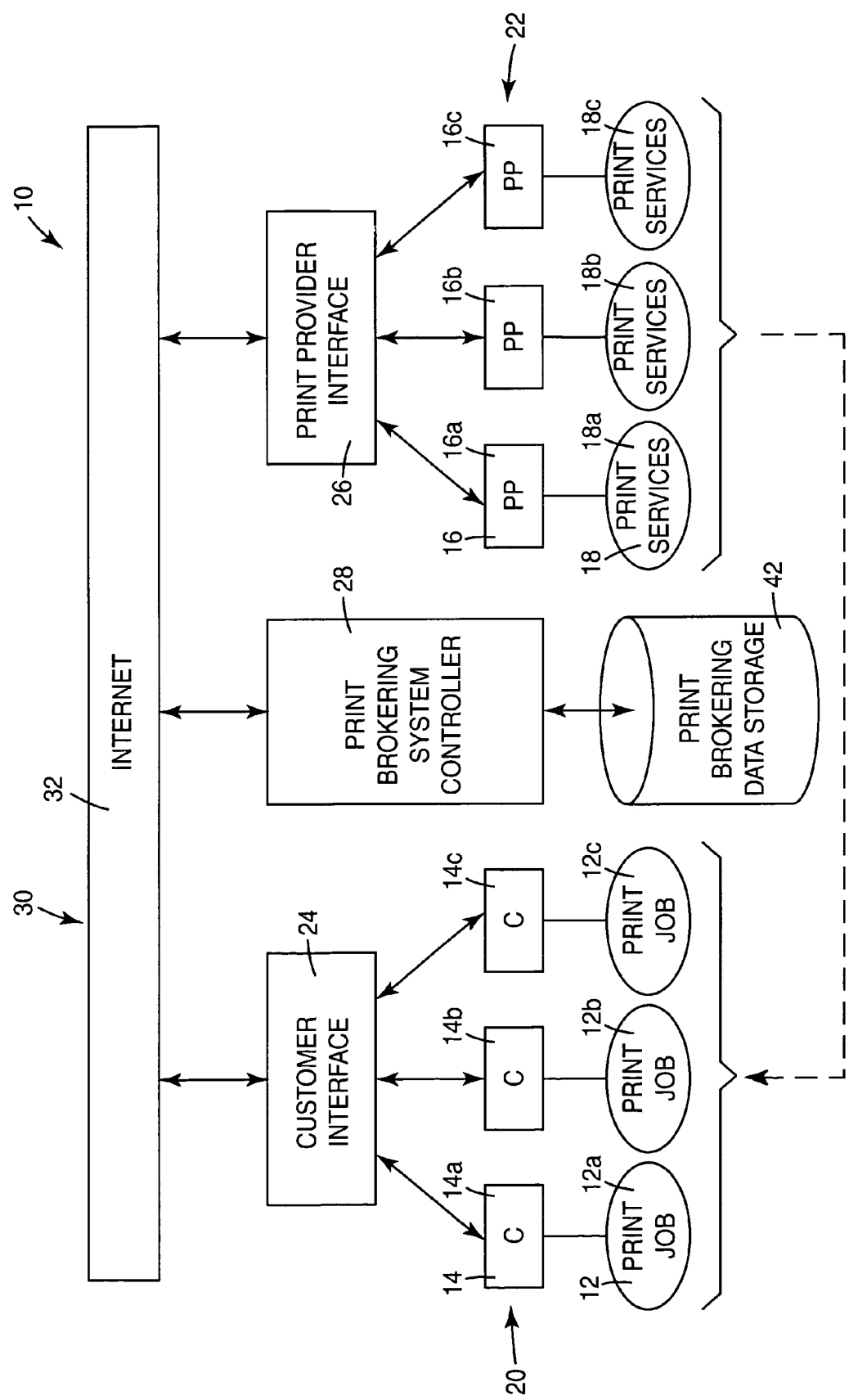
FIG. 1 is a block diagram illustrating one exemplary embodiment of a print brokering system according to the present invention.

An Internet print brokering system according to the present invention is illustrated generally at 10 in FIG. 1. Print brokering system 10 facilitates automatic brokering of a print job 12a, 12b, 12c of a customer 14a, 14b, 14c between customer 14a, 14b, 14c and a print provider 16a, 16b, 16c which provides print services 18a, 18b, 18c. For clarity, print job 12a, 12b, 12c, customer 14a, 14b, 14c, print provider 16a, 16b, 16c, and print services 18a, 18b, 18c are referred to hereinafter as print job 12, customer 14, print provider 16, and print services 18, respectively. As such, customer 14 may be one of a plurality of customers 20 each having a separate print job 12. Print provider 16 may be one of a plurality of print providers 22 each providing separate print services 18. Accordingly, print brokering system 10 unites customers 20 having specific printing needs with print providers 22 which can fulfill those printing needs.

Print job 12, as used herein, is defined to include a piece of work requiring production and/or reproduction of printed matter. Customer 14, as used herein, is defined to include an entity or entities such as a consumer, an employee, or another print provider requesting or soliciting printing services, finishing services, delivery services, and/or other print processing services. Print provider 16, as used herein, is defined to include an entity or entities offering, providing, and/or assisting in printing services, finishing services, delivery services, and/or other print processing services. Print services 18, as used herein, is defined to include printing services, finishing services, delivery services, and/or other print processing services.

In one exemplary embodiment, print brokering system 10 includes a customer interface 24, a print provider interface 26, and a print brokering system controller 28. Customer interface 24, print provider interface 26, and print brokering system controller 28 communicate with each other via a network communication link 30. Network communication link 30, as used herein, is defined to include an Internet communication link, an Intranet communication link, or similar high-speed communication link. In one preferred embodiment, network communication link 30 includes an Internet communication link 32. While the following description only refers to Internet communication link 32, it is understood that the use of other network communication links is within the scope of the present invention.

In one exemplary embodiment, customers 20, print providers 22, and print brokering system controller 28 are all located remote from each other (i.e., at different locations). Thus, communications between customers 20 and print brokering system controller 28, communications between print providers 22 and print brokering system controller 28, and communications between customers 20 and print providers 22 are conducted over Internet communication link 32. Preferably, print providers 22 communicate with print brokering system controller 28 via Internet communication link 32. It is, however, within the scope of the present invention for print providers 22 to communicate with print brokering system controller 28 in other manners (e.g., a direct connection).

Print brokering system 10, including print brokering system controller 28, can be implemented in hardware via a microprocessor, programmable logic device, or state machine, in firmware, or in software within a given device. In one aspect, at least a portion of the software programming is written in JAVA programming language, and each of the main components communicate via Internet communication link 32 using a communication bus protocol. For example, the present invention may or may not use a TCP/IP protocol suite for data transport. Other programming languages and communication bus protocols suitable for use with print brokering system 10 will become apparent to those skilled in the art after reading the present application.

Print brokering system controller 28 includes hardware, software, firmware, or a combination of these. In one preferred embodiment, print brokering system controller 28 includes a computer server or other microprocessor based system capable of performing a sequence of logic operations. In addition, print brokering system controller 28 can include a microprocessor embedded system/appliance incorporating tailored appliance hardware and/or dedicated single purpose hardware.

Figure 2:
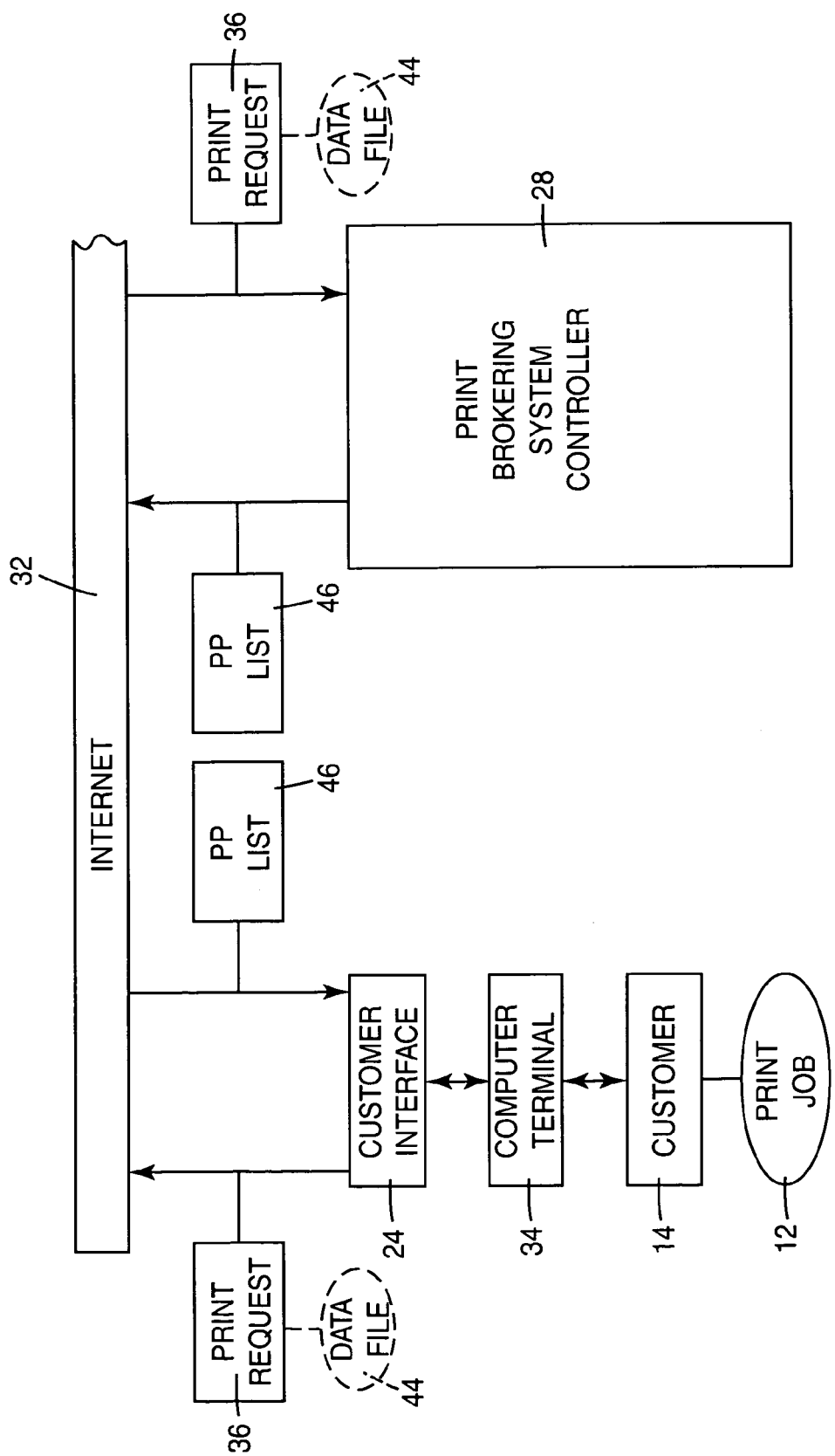
FIG. 2 is a block diagram illustrating one exemplary embodiment of information flow through a portion of the print brokering system of FIG. 1.

As illustrated in FIG. 2, customer 14 accesses customer interface 24 of print brokering system 10 via a computer terminal 34. Computer terminal 34 includes, for example, an input device such as a keyboard and/or a mouse and a display device such as a monitor, as is well known in the art. In one exemplary embodiment, customer 14 enters print brokering system 10 and, therefore, accesses customer interface 24 by selecting "File/Print . . . " in a program running on computer terminal 34 and by selecting print brokering system 10; or an application incorporating print brokering system 10, as the "Name" of the printer.

Customer 14 interacts with customer interface 24 via computer terminal 34 to generate a print request 36 for print job 12 and submit print request 36 to print brokering system controller 28 via Internet communication link 32. Print request 36 identifies attributes of print job 12 specified by customer 14, as described below. Customer 14 also interacts with customer interface 24 to register with print brokering system 10 as well as submit billing and shipping information to print brokering system 10. Submitting billing and shipping information to print brokering system 10 includes, for example, submitting payment information such as a credit card or other account information and delivery information such as a shipping address.

Figure 3:
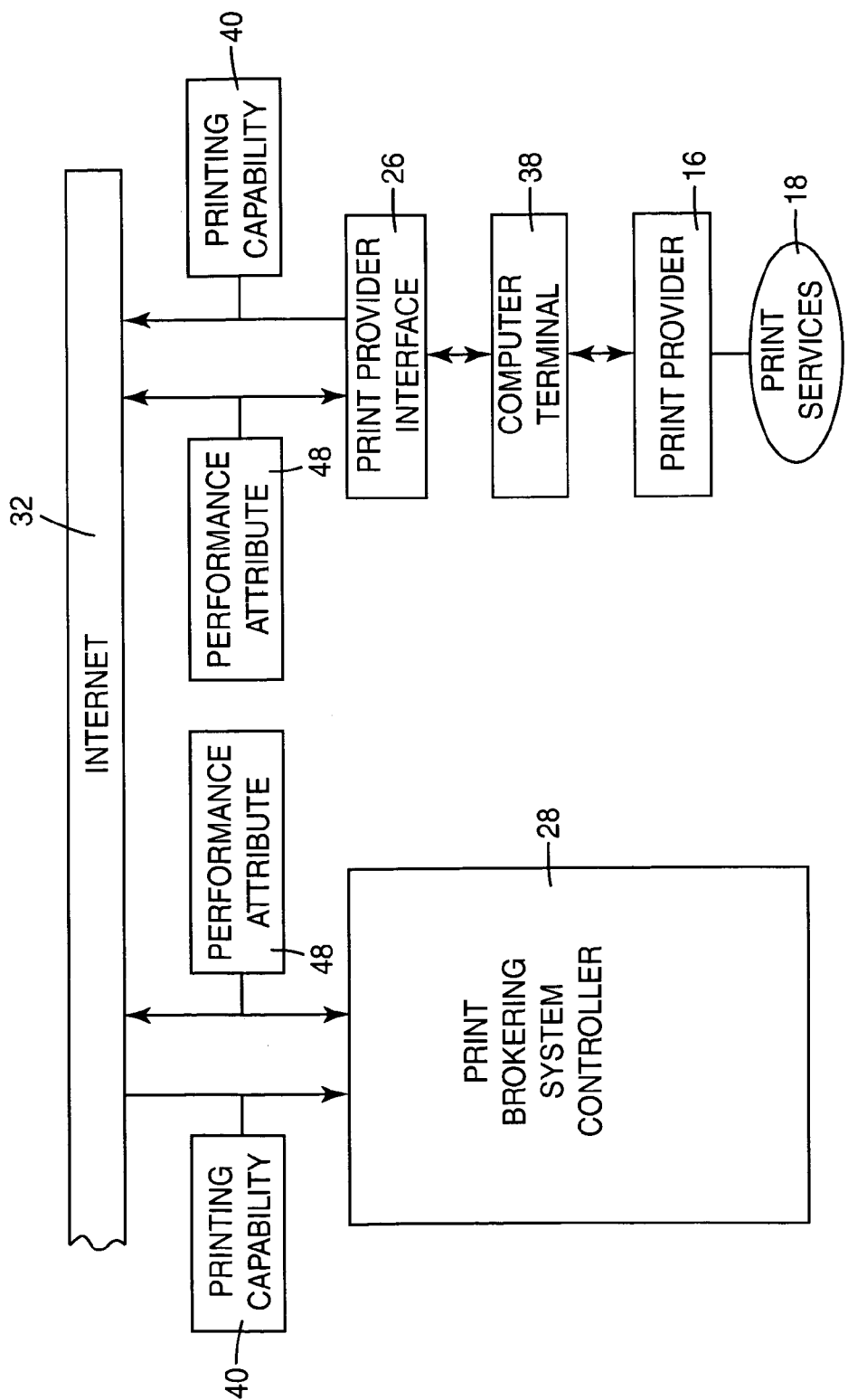
FIG. 3 is a block diagram illustrating one exemplary embodiment of information flow through another portion of the print brokering system of FIG. 1.

As illustrated in FIG. 3, print provider 16 accesses print provider interface 26 of print brokering system 10 via a computer terminal 38. Computer terminal 38 includes, for example, an input device such as a keyboard and/or a mouse and a display device such as a monitor, as is well known in the art.

Print provider 16 interacts with print provider interface 26 via computer terminal 38 to register a printing capability 40 with print brokering system controller 28 via Internet communication link 32. Printing capability 40 identifies attributes of print services 18 provided by print provider 16, as described below. Print provider 16 also interacts with print provider interface 26 to register with print brokering system 10 as well as submit responses to queries from print brokering system 10.

In one exemplary embodiment, as illustrated in FIG. 1, print brokering system 10 includes a print brokering data storage system 42. Print brokering data storage system 42 constitutes a database of one or more data files for print brokering system 10. Examples of print brokering data storage system 42 include non-volatile memory (e.g., a hard disk drive or other persistent storage device) and may include volatile memory (e.g., random access memory (RAM)). Data is transferred to and from print brokering data storage system 42 via print brokering system controller 28.

In one exemplary embodiment, print brokering system controller 28 communicates with and transfers printing capability 40 of print providers 22 to print brokering data storage system 42. As such, print brokering data storage system 42 stores printing capability 40 of print providers 22 for subsequent retrieval and processing. More specifically, when print brokering system controller 28 receives printing capability 40 from print provider 16, printing capability 40 is stored as a data file in print brokering data storage system 42. Print brokering system controller 28, therefore, subsequently retrieves printing capability 40 from print brokering data storage system 42 for processing.

In one exemplary embodiment, a data file 44 of print job 12 is submitted with print request 36, as illustrated in FIG. 2. Data file 44 of print job 12 is uploaded to print brokering system controller 28 via Internet communication link 32. As such, print brokering system controller 28 stores data file 44 of print job 12 in print brokering data storage system 42 for subsequent downloading to print provider 16.

When customer 14 selects print provider 16 to complete print job 12, print provider 16 downloads data file 44 of print job 12 from print brokering system controller 28 and, more specifically, print brokering data storage system 42 via Internet communication link 32. Thus, print job 12 is submitted to print provider 16 through print brokering system controller 28. It is, however, within the scope of the present invention for print job 12 to be submitted directly to print provider 16 from customer 14.

Figure 4:
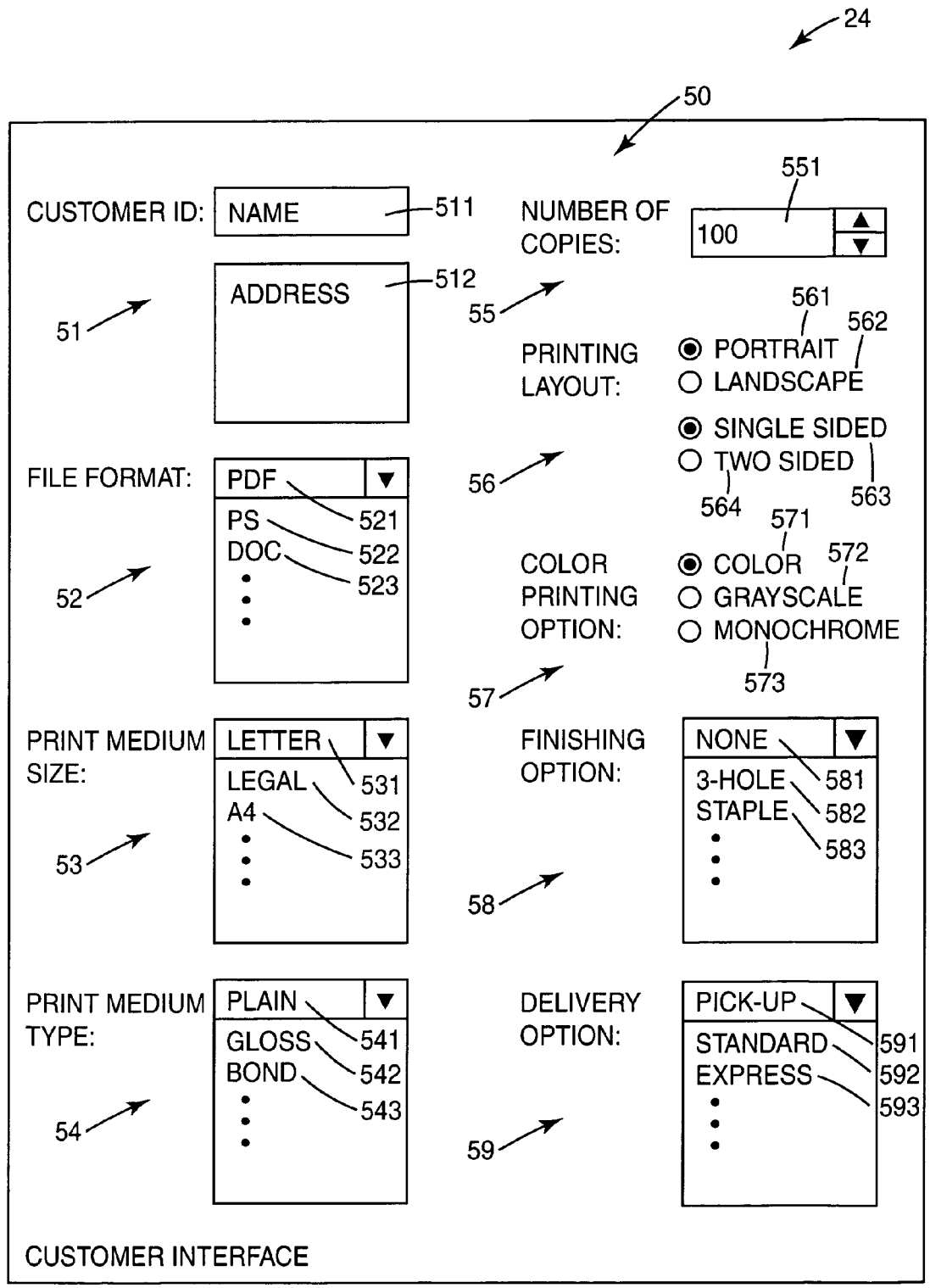
FIG. 4 is a diagram illustrating one exemplary embodiment of a portion of a customer interface of the print brokering system of FIG. 1.

In one exemplary embodiment, as illustrated in FIG. 4, a portion of customer interface 24 includes a plurality of input fields 50 with which customer 14 interacts to specify attributes of print job 12. As such, customer 14 interacts with input fields 50, via an input device such as a keyboard and/or a mouse of computer terminal 34, to generate print request 36 for print job 12. Input fields 50 include, for example, a customer identification field 51, a file format field 52, a print medium size field 53, a print medium type field 54, a number of copies field 55, a printing layout field 56, a color printing option field 57, a finishing option field 58, and a delivery option field 59. Input fields 50 each include at least one subfield providing data entry points or representing available options for generating and submitting print request 36.

Customer identification field 51 includes, for example, subfields 511 and 512 which provide data entry points for a name and an address, respectively, of customer 14. File format field 52 includes, for example, subfields 521, 522, 523 which represent different file formats for print job 12. Print medium size field 53 includes, for example, subfields 531, 532, 533 which represent different sizes of print medium for print job 12. Print medium type field 54 includes, for example, subfields 541, 542, 543 which represent different types of print medium for print job 12. Number of copies field 55 includes subfield 551 in which a number of copies included in print job 12 is specified. Printing layout field 56 includes, for example, subfields 561, 562, 563, and 564 which represent different printing layouts for print job 12. Color printing option field 57 includes, for example, subfields 571, 572, and 573 which represent different color printing options for print job 12. Finishing option field 58 includes, for example, subfields 581, 582, 583 which represent different finishing options for print job 12. Delivery option field 59 includes, for example, subfields 591, 592, 593 which represent different delivery options for print job 12.

Additional file formats, print medium sizes, print medium types, printing layouts, color printing options, finishing options, and delivery options, as are well known in the art, may be represented by additional subfields of file format field 52, print medium size field 53, print medium type field 54, printing layout field 56, color printing option field 57, finishing option field 58, and delivery option field 59, respectively. Selecting and/or completing various subfields of input fields 50, therefore, identifies attributes of print job 12 as specified by customer 14. In one exemplary embodiment, when data file 44 of print job 12 is submitted with print request 36, identification or selection of some input fields 50 of customer interface 24 are inferred from a content of data file 44, as described below. In addition, customer 14 may store preferences of various subfields as default selections.

In one illustrative embodiment of customer interface 24, subfields 521, 522, and 523 of file format field 52 represent a Portable Document Format (.PDF), a PostScript (.PS) format, and a Microsoft® Word Document (.DOC) format, respectively. Selecting subfield 521, therefore, identifies the file from which print job 12 is to be printed as a Portable Document Format (.PDF) file. Subfields 531, 532, and 533 of print medium size field 53 represent a Letter size, a Legal size, and an A4 size of print medium, respectively. Selecting subfield 531, therefore, identifies the size of print medium upon which print job 12 is to be printed as Letter. Subfields 541, 542, and 543 of print medium type field 54 represent a Plain, a Gloss, and a Bond type of print medium, respectively. Selecting subfield 541, therefore, identifies the type of print medium upon which print job 12 is to be printed as Plain. Subfields 561, 562, 563, and 564 of printing layout field 56 represent an orientation of print job 12 including Portrait and Landscape and an imposition of print job 12 including Single-Sided and Double-Sided, respectively. Selecting subfields 561 and 563, therefore, identifies the orientation and the imposition of print job 12 as Portrait and Single-Sided, respectively. Subfields 571, 572, and 573 of color printing option field 57 represent Color Printing, Grayscale Printing, and Monochrome Printing, respectively. Selecting subfield 571, therefore, identifies Color Printing for print job 12. Subfields 581, 582, and 583 of finishing option field 58 represent No Finishing, 3-Hole Finishing, and Staple Finishing, respectively. Selecting subfield 581, therefore, identifies no finishing option for print job 12. Subfields 591, 592, and 593 of delivery option field 59 represent Pick-up, Standard Delivery, and Express Delivery, respectively. Selecting subfield 591, therefore, identifies customer pick-up of print job 12.

In one exemplary embodiment, input of specific input fields 50 dictates a selection of other input fields 50. When customer 14 selects a specific subfield, for example, additional subfields may appear and/or existing subfields may be unavailable. In addition, when customer 14 selects a specific subfield, additional subfields may be automatically selected and/or completed.

Figure 5:
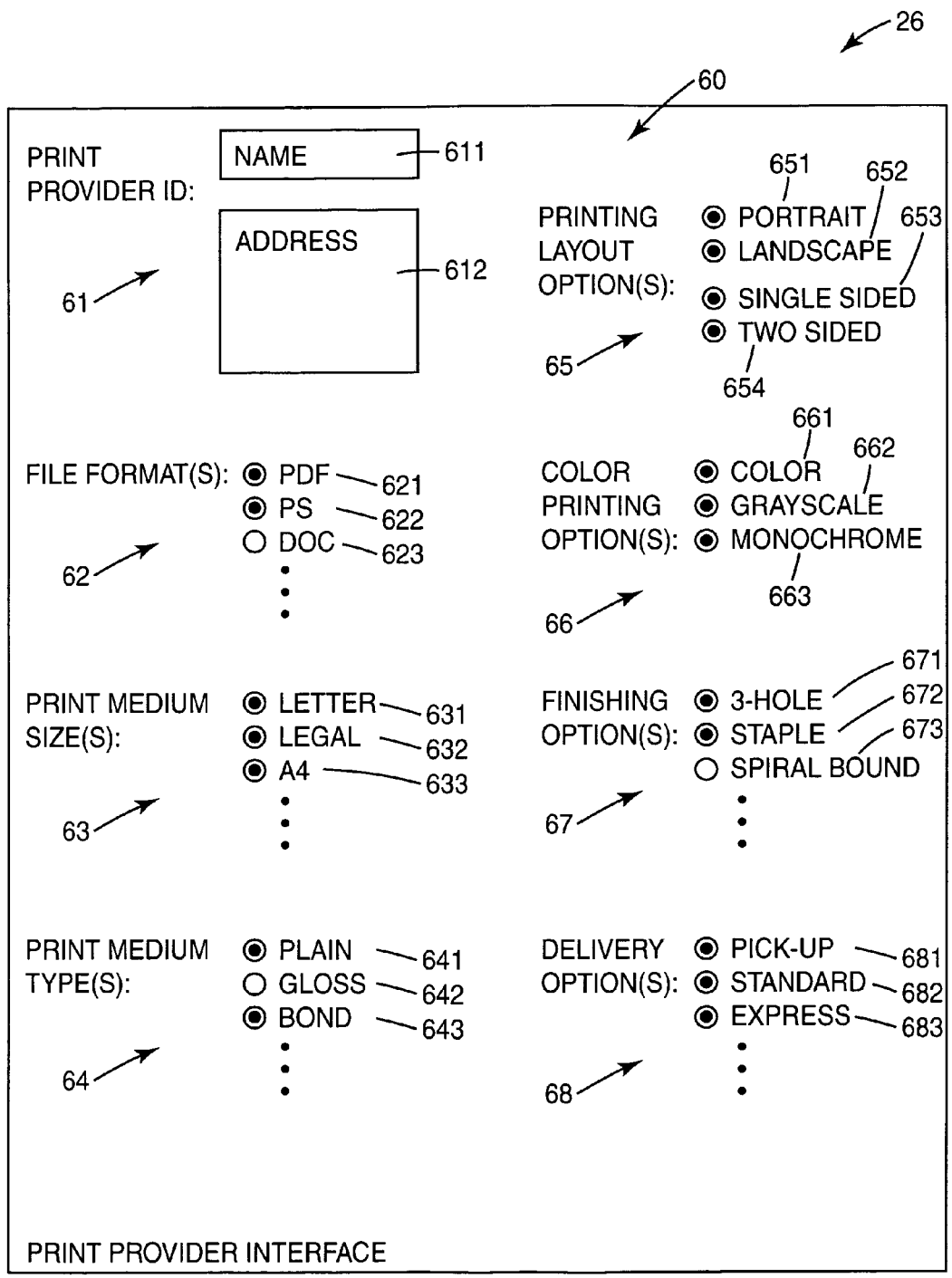
FIG. 5 is a diagram illustrating one exemplary embodiment of a portion of a print provider interface of the print brokering system of FIG. 1.

In one exemplary embodiment, as illustrated in FIG. 5, a portion of print provider interface 26 includes a plurality of input fields 60 with which print provider 16 interacts to specify attributes of print services 18. Print provider 16 interacts with input fields 60, via an input device such as a keyboard and/or a mouse of computer terminal 38, to register printing capability 40. Input fields 60 include, for example, a print provider identification field 61, a file format options field 62, a print medium size options field 63, a print medium type options field 64, a printing layout options field 65, a color printing options field 66, a finishing options field 67, and a delivery options field 68. Input fields 60 each include at least one subfield providing data entry points or representing available options for registering printing capability 40.

Print provider identification field 61 includes, for example, subfields 611 and 612 which provide data entry points for a name and an address, respectively, of print provider 16. File format options field 62 includes, for example, subfields 621, 622, 623 which represent different file formats that print provider 16 supports and, more specifically, file formats from which print provider 16 is capable of printing. Print medium size options field 63 includes, for example, subfields 631, 632, 633 which represent different sizes of print medium upon which print provider 16 is capable of printing. Print medium type options field 64, includes, for example, subfields 641, 642, 643 which represent different types of print medium upon which print provider 16 is capable of printing. Printing layout options field 65 includes, for example, subfields 651, 652, 653, and 654 which represent different printing layouts that print provider 16 is capable of providing as print services 18. Color printing options field 66 includes, for example, subfields 661, 662, and 663 which represent different color printing options that print provider 16 is capable of offering as print services 18. Finishing options field 67 includes, for example, subfields 671, 672, 673 which represent different finishing options that print provider 16 is capable of providing as printing services 18. Delivery options field 68 includes, for example, subfields 681, 682, 683 which represent different delivery options that print provider 16 is capable of providing as print services 18.

Additional file formats, print medium sizes, print medium types, printing layout options, color printing options, finishing options, and delivery options, as are well known in the art, may be represented by additional subfields of file format options field 62, print medium size options field 63, print medium type options field 64, printing layout options field 65, color printing options field 66, finishing options field 67, and delivery options field 68, respectively. Selecting and/or completing various subfields of input fields 60, therefore, identifies attributes of print services 18 as provided by print provider 16 in a manner similar to how selecting and/or completing various subfields of input fields 50 identifies attributes of print job 12 as specified by customer 14. Print provider 16, however, may select and/or complete multiple subfields within each input field 60 to specify the different options available with print services 18.

In one exemplary embodiment, when print provider 16 selects a specific subfield, print provider 16 may also select other subfields per the specific subfield. When print provider 16 selects a specific print medium type, for example, print provider 16 may also select various print medium sizes per the specific print medium type. In addition, print provider 16 may specify or select a range of various subfields for a specific input field 60.

It is to be understood that FIGS. 4 and 5 are simplified illustrations of one exemplary embodiment of customer interface 24 and print provider interface 26, respectively. The illustrative presentation of input fields 50 and 60 including the respective subfields, for example, has been simplified for clarity of the invention. The subfields may be presented, for example, as open fields, pulldown menus, toggle selections, and/or highlighted or framed selections. In addition, customer interface 24 and/or print provider interface 26 may be presented, for example, in one or more screens or views. Furthermore, customer 14 and/or print provider 16 may generate print request 36 and register printing capability 40 by responding to query-based systems or applications. It is understood that such alternatives are within the scope of the present invention.

Figure 6:
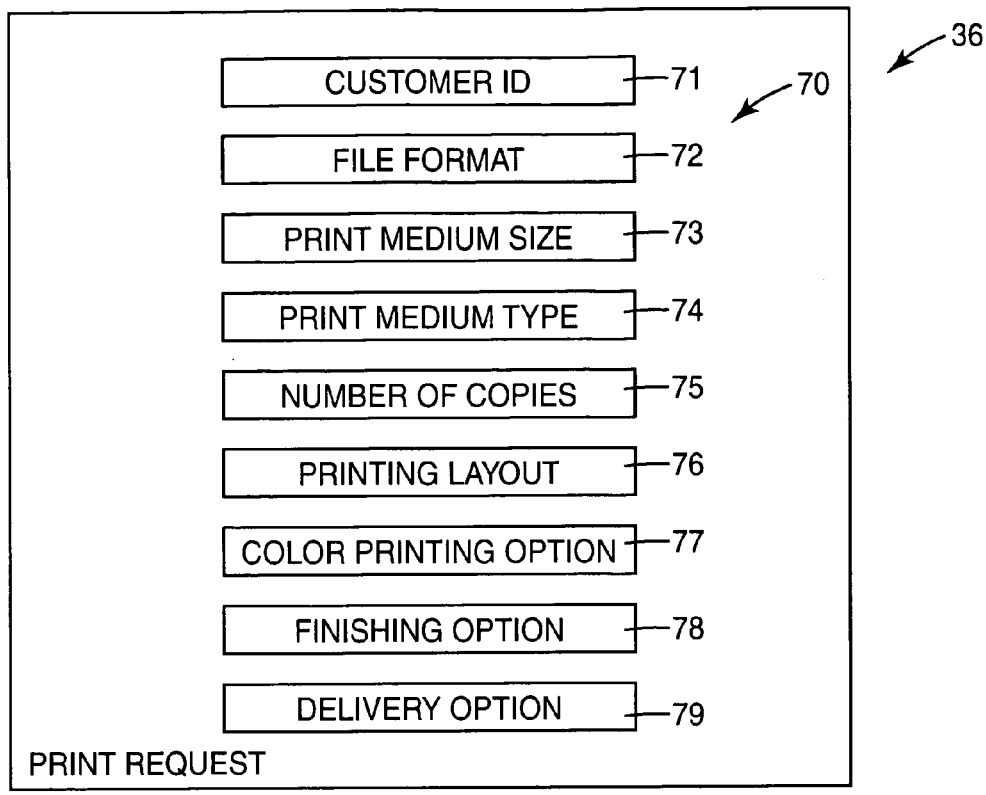
FIG. 6 is a diagram illustrating one exemplary embodiment of a print request generated and submitted by a customer with the print brokering system of FIG. 1.

By interacting with customer interface 24 and print provider interface 26, customer 14 and print provider 16 generate print request 36 and register printing capability 40, respectively. In one exemplary embodiment, as illustrated in FIG. 6, print request 36 includes a plurality of print request attributes 70 which define print job 12. Print request attributes 70 include, for example, a customer identification attribute 71, a file format attribute 72, a print medium size attribute 73, a print medium type attribute 74, a number of copies attribute 75, a printing layout attribute 76, a color printing option attribute 77, a finishing option attribute 78, and a delivery option attribute 79. Print request attributes 70 coincide with selections as specified in input fields 50 of customer interface 24.

Customer identification attribute 71 includes, for example, the name and the address of customer 14 as specified in customer identification filed 51 of customer interface 24. File format attribute 72 includes the format of the file from which print job 12 is to be printed as specified in file format field 52 of customer interface 24. Print medium size attribute 73 includes the size of medium upon which print job 12 is to be printed as specified in print medium size field 53 of customer interface 24. Print medium type attribute 74 includes the type of medium upon which print job 12 is to be printed as specified in print medium type field 54 of customer interface 24. Number of copies attribute 75 includes the number of copies included in print job 12 as specified in number of copies field 55 of customer interface 24. Printing layout attribute 76 includes the layout of how print job 12 is to be printed as specified in printing layout field 56 of customer interface 24. Color printing option attribute 77 includes whether print job 12 is to be printed in color as specified in color printing option field 57 of customer interface 24. Finishing option attribute 78 includes the finish to be applied to print job 12 as specified in finishing option field 58 of customer interface 24. Delivery option attribute 79 includes how print job 12 is to be delivered to customer 14 as specified in delivery option field 59 of customer interface 24.

In one exemplary embodiment, when data file 44 of print job 12 is submitted with print request 36, print brokering system controller 28 infers or determines a number of print request attributes 70. Print brokering system controller 28 determines, for example, file format attribute 72, print medium size attribute 73, and printing layout attribute 76 of print job 12 from data file 44. Customer 14, therefore, need only enter those print request attributes 70 which are not determined by print brokering system controller 28. As such, it is not necessary for customer 14 to enter all print request attributes 70.

Figure 7:
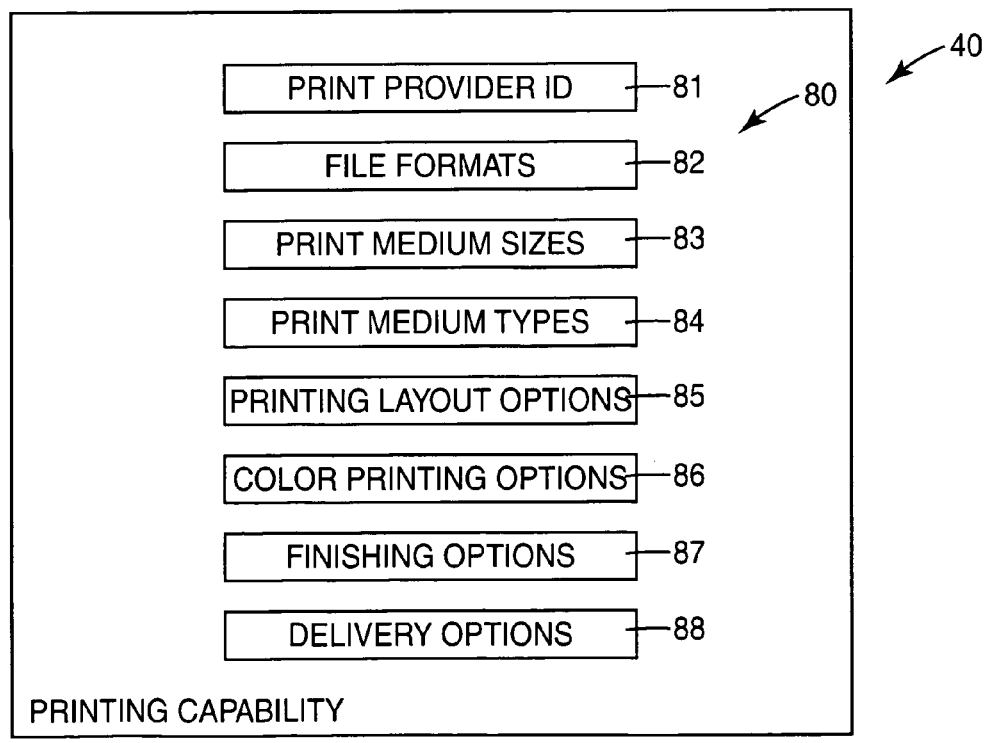
FIG. 7 is a diagram illustrating one exemplary embodiment of a printing capability registered by a print provider with the print brokering system of FIG. 1.

In one exemplary embodiment, as illustrated in FIG. 7, printing capability 40 includes a plurality of printing capability attributes 80 which define print services 18. Printing capability attributes 80, include, for example, a print provider identification attribute 81, a file formats attribute 82, a print medium sizes attribute 83, a print medium types attribute 84, a printing layout options attribute 85, a color printing options attribute 86, a finishing options attribute 87, and a delivery options attribute 88. Printing capability attributes 80 coincide with selections as specified in input fields 60 of print provider interface 26 in a manner similar to how print request attributes 70 coincide with selections as specified in input fields 50 of customer interface 24.

Figure 8:
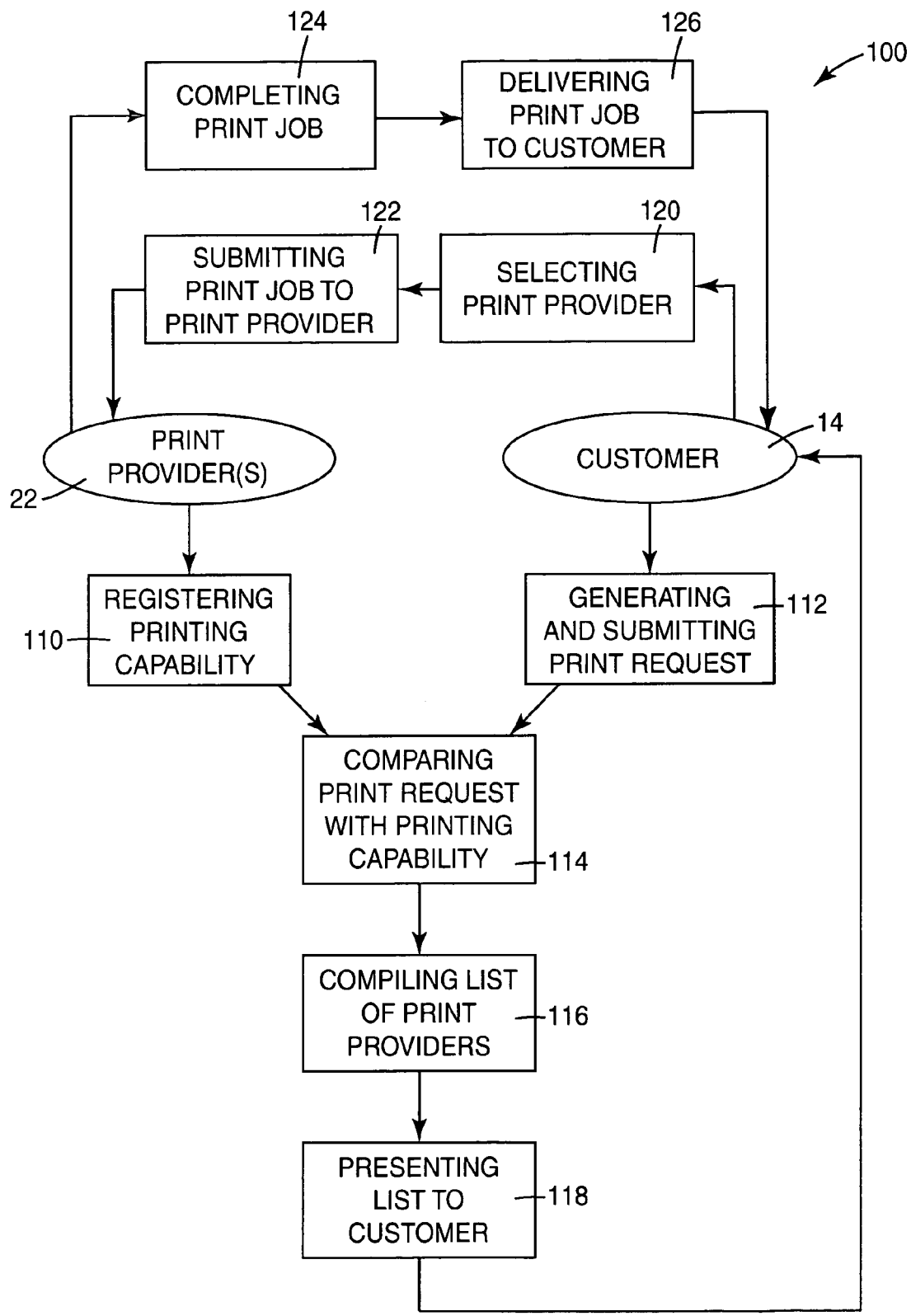
FIG. 8 is a flow diagram illustrating one exemplary embodiment of a method of brokering a print job between a customer and a plurality of print providers according to the present invention.

In FIG. 8, a flow diagram illustrating one exemplary embodiment of a method of brokering print job 12 between customer 14 and print providers 22 according to the present invention is illustrated generally at 100. Reference is also made to FIGS. 1–7. At step 110, at least one print provider 16 of the plurality of print providers 22 registers a respective printing capability 40 of print services 18 with print brokering system controller 28 and, at step 112, customer 14 generates and submits a respective print request 36 for print job 12 to print brokering system controller 28. In one exemplary embodiment, customer 14 generates and submits print request 36 to print brokering system controller 28 via Internet communication link 32, as illustrated in FIG. 2, and print providers 22 register printing capability 40 with print brokering system controller 28 via Internet communication link 32, as illustrated in FIG. 3.

Preferably, print providers 22 register printing capability 40 at step 110 before customer 14 generates and submits print request 36 at step 112. It is, however, within the scope of the present invention for print providers 22 to register printing capability 40 after customer 14 generates and submits print request 36 and for print providers 22 to re-register or update printing capability 40 with print brokering system controller 28. If, for example, print provider 16 modifies print services 18 by adding, deleting, and/or upgrading equipment, components, and/or services, print provider 16 can re-register printing capability 40 with print brokering system controller 28. In addition, it is also within the scope of the present invention for customer 14 to re-generate and/or re-submit print request 36 to print brokering system controller 28.

Next, in step 114, after print brokering system controller 28 receives print request 36, print brokering system controller 28 compares print request 36 with printing capability 40 of print providers 22 to determine which print providers 22 have print services 18 to fulfill print job 12.

To compare print request 36 with printing capability 40, print request attributes 70 of print job 12, as specified by customer 14, are compared with printing capability attributes 80 of print services 18, as provided by print providers 22. Thus, print brokering system controller 28 determines which print providers 22 have printing capability 40 to fulfill print request 36 and, therefore, complete print job 12. Accordingly, only those print providers 22 which have printing capability 40 to fulfill print request 36 are identified in step 114. Conversely, those print providers which do not have printing capability 40 to fulfill print request 36 are not identified. Print brokering system controller 28, therefore, effectively filters those print providers which do not have printing capability 40 to fulfill print request 36.

When printing capability 40 of print providers 22 is registered with print brokering system controller 28 in step 110, print brokering system controller 28 stores printing capability 40 in print brokering data storage system 42, as described above. As such, print brokering system controller 28 retrieves printing capability 40 from print brokering data storage system 42 when comparing print request with printing capability 40 in step 114.

Figures 9, 10:
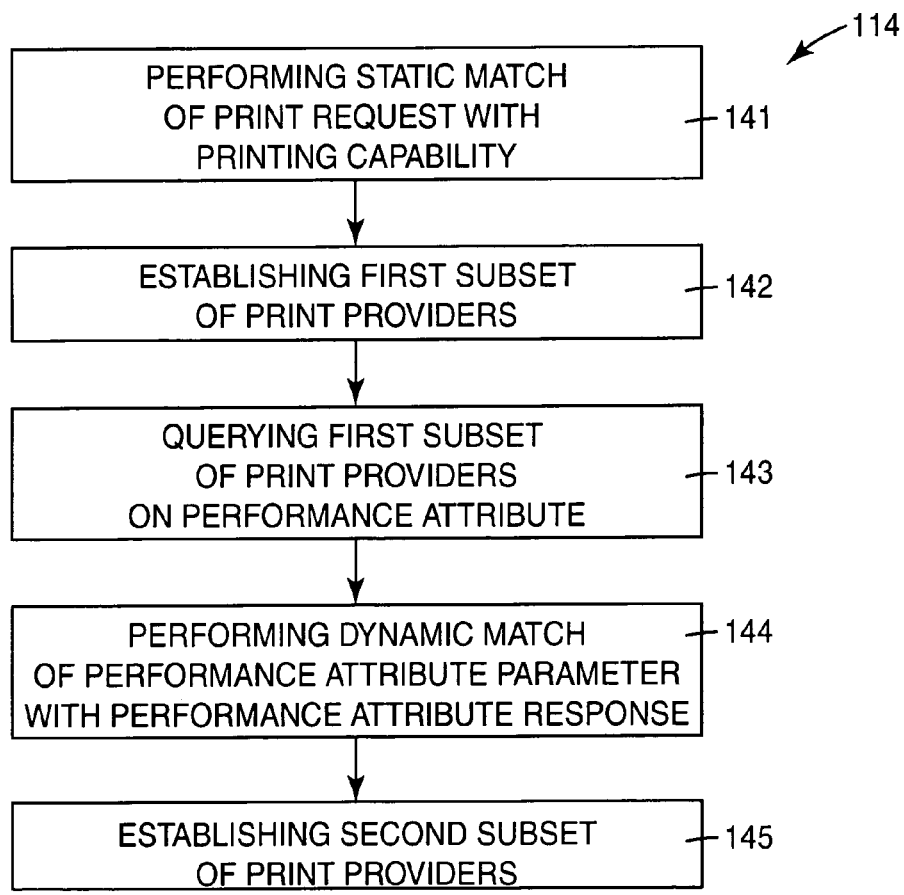
FIG. 9 is a diagram illustrating one exemplary embodiment of a list of print providers established during the method of FIG. 8.
FIG. 10 is a flow diagram illustrating one exemplary embodiment of a method of comparing a print request with a printing capability in the method of FIG. 8.

Next, in step 116, a list 46 of print providers 22 which have printing capability 40 to fulfill print request 36, as established by print brokering system controller 28 in step 114, is compiled. In one exemplary embodiment, list 46 includes an identification field 461, a name field 462, an address field 463, and an attribute field 464, as illustrated in FIG. 9. Identification field 461, name field 462, and address field 463 include identification, name, and address information, respectively, of print providers 22 which have printing capability 40 to fulfill print request 36. Attribute field 464 includes an attribute of print request 36 and, more specifically, an attribute of completing print job 12 such as price, conveyed as described below.

Next, in step 118, list 46, as compiled by print brokering system controller 28 in step 116, is presented to customer 14. In one exemplary embodiment, list 46 is presented to customer 14 from print brokering system controller 28 via Internet communication link 32 and customer interface 24, as illustrated in FIG. 2.

Next, in step 120, customer 14 selects at least one print provider 16 from list 46 to complete print job 12 and, in step 122, submits print job 12 to the selected print provider 16.

Then, in step 124, the selected print provider 16 completes print job 12 and, in step 126, delivers completed print job 12 to customer 14. Delivery of completed print job 12 to customer 14 from print provider 16 is also represented by the dashed line in FIG. 1.

In one exemplary embodiment, as illustrated in FIG. 10, the step of comparing print request 36 with printing capability 40 in step 114 includes performing both a static match and a dynamic match of print job 12 of customer 14 with print services 18 of print providers 22. The static match includes a comparison of attributes of print job 12 which are generally constant over time. Such attributes include, for example, print medium sizes, print medium types, printing layouts, etc. The dynamic match includes a comparison of aspects of print job 12 which are generally susceptible to change. Such aspects include, for example, price, availability, schedule, etc.

The step of comparing print request 36 with printing capability 40 in step 114, therefore, includes performing a static match of print request 36 of customer 14 with printing capability 40 of print providers 22, as indicated in step 141. The static match of step 141 includes, for example, a comparison of print request attributes 70 and printing capability attributes 80 which are generally constant over time. As such, a first subset of print providers 22 which satisfy the static match of step 141 is established, as indicated in step 142. The first subset of print providers 22 may include all or less than all print providers 22.

Next, in step 143, a query of the first subset of print providers 22 is performed. The query is of a performance attribute 48 of print job 12. Performance attribute 48 of print job 12 includes, for example, a price of print job 12, an availability of print providers 22 to complete print job 12, and/or a schedule or turnaround time for completing print job 12.

In one exemplary embodiment, the query of print providers 22 is performed by print brokering system controller 28 via Internet communication link 32 and print provider interface 26, as illustrated in FIG. 3. Thus, step 143 includes a real-time query of print providers 22. For responding to the query of step 143, each print provider 16 may establish a predefined model or proxied application which automatically responds to the query of step 143.

The query of the first subset of print providers 22 in step 143 may permit the first subset of print providers 22 to verify that they do indeed have printing capability 40 to fulfill print request 36. Thus, print providers 22 may correct or update a printing capability 40. In addition, print providers 22 may opt out of the dynamic match by, for example, not responding.

After receiving a response to the query of step 143, a dynamic match of performance attribute 48 is performed, as indicated in step 144. The dynamic match of step 144 includes, for example, a comparison of aspects of print job 12 which are generally susceptible to change. The dynamic match of step 144 includes a comparison of a parameter of performance attribute 48, as submitted by customer 14 with print request 36, with the response of print providers 22 to the query of step 143. The parameter of performance attribute 48 includes, for example, a price limit and/or price range for print job 12, a required start time for print job 12, and/or a required completion time for print job 12. As such, a second subset of print providers 22 which satisfy the dynamic match of step 144 is established in step 145. The second subset of print providers 22 may include all or less than all of the print providers 22 included in the first subset of print providers 22.

In one exemplary embodiment, print providers 22 which have printing capability 40 to fulfill print request 36 are sorted or ranked based on dynamic and/or static attributes. Print brokering system controller 28 may rank print providers 22, for example, based on a price of completing print job 12, as described above. In addition, print brokering system controller 28 may rank print providers 22, for example, based on location or, more specifically, proximity to customer 14, as presented in list 46.

By comparing print request 36 of customers 20 with printing capability 40 of print providers 22, print brokering system 10 serves as an intermediary between customers 20 and print providers 22. Thus, print brokering system 10 unites customers 20 having printing needs with print providers 22 providing print services. More specifically, print brokering system 10 automatically identifies which print providers 22 have the specific print services to fulfill the specific printing needs of customers 20. As such, print brokering system 10 matches customers 20 having print job 12 with select print providers 22 capable of completing print job 12 by comparing print request 36 for print job 12 with printing capability 40 of print services 18. It is, therefore, not necessary for customers 20 to have prior knowledge of print providers 22. In addition, by defining Internet communication link 32 between customers 20, print providers 22, and print brokering system controller 28, customers 20 can easily identify and have direct access to print providers 22 which have the capability to fulfill the printing needs.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of brokering a print job between a customer and a plurality of print providers, the method comprising:
    providing a print brokering system controller having a printing capability of each of the print providers registered therewith;
    defining a network communication link between the customer and the print brokering system controller;
    receiving a print request for the print job at the print brokering system controller via the network communication link, including receiving a parameter of a performance attribute of the print job;
    comparing the print request for the print job with the printing capability of each of the print providers and determining which of the print providers have the printing capability to fulfill the print request, including performing a first match of the print request with the printing capability of the print providers and establishing a first subset of the print providers based on the first match, querying the first subset of the print providers on the performance attribute of the print job and receiving a response thereto, and performing a second match of the parameter of the performance attribute with the response thereto and establishing a second subset of the print providers based on the second match; and
    compiling a list of the second subset of the print providers which has the printing capability to fulfill the print request and matches the performance attribute of the print job, and presenting the list to the customer via the network communication link, the list excluding print providers which do not have the printing capability to fulfill the print request.

2. The method of claim 1, wherein defining the network communication link includes defining an Internet communication link between the customer and the print brokering system controller.

3. The method of claim 1, further comprising:
    registering the printing capability of each of the print providers with the print brokering system controller.

4. The method of claim 3, wherein defining the network communication link includes defining the network communication link between the customer, the print providers, and the print brokering system controller, and wherein registering the printing capability includes registering the printing capability of each of the print providers with the print brokering system controller via the network communication link.

5. The method of claim 3, wherein registering the printing capability includes registering at least one of a file format compatibility, a print medium capability, a printing layout capability, a color printing capability, a finishing capability, a delivery capability, and an identification of each of the print providers.

6. The method of claim 3, wherein registering the printing capability includes storing a registration of the printing capability of each of the print providers, and wherein comparing the print request includes retrieving the printing capability of each of the print providers.

7. The method of claim 1, wherein receiving the print request includes specifying at least one of a file format, a number of copies, a print medium, a printing layout, a color printing option, a finishing option, a delivery option, and a customer identification for the print job.

8. The method of claim 1, wherein the first subset of the print providers is one of less than the plurality of print providers and equal to the plurality of print providers.

9. The method of claim 8, wherein the second subset of the print providers is one of less than the first subset of the print providers and equal to the first subset of the print providers.

10. The method of claim 1, wherein the performance attribute of the print job includes at least one of a price of the print job, an availability to complete the print job, and a turnaround time for completing the print job.

11. The method of claim 1, wherein compiling the list includes ranking the second subset of the print providers based on the performance attribute of the print job.

12. The method of claim 1, wherein comparing the print request and compiling the list are performed by the print brokering system controller.

13. The method of claim 1, wherein compiling the list includes ranking the second subset of the print providers based on at least one attribute of the print request.

14. The method of claim 1, further comprising:
selecting at least one print provider of the second subset of the print providers to fulfill the print job; and
submitting the print job to the at least one print provider.

15. The method of claim 14, wherein defining the network communication link includes defining the network communication link between the customer, the print providers, and the print brokering system controller, and wherein submitting the print job includes submitting the print job to the at least one print provider via the network communication link.

16. A system for brokering a print job between a customer and a plurality of print providers, the system comprising:
a print brokering system controller configured to have a printing capability of the print providers registered therewith,
wherein the print brokering system controller is adapted to receive a print request for the print job and compare the print request with the printing capability of the print providers to determine which of the print providers have the printing capability to fulfill the print request, the print request including a parameter of a performance attribute of the print job,
wherein the print brokering system controller is adapted to perform a first match of the print request with the printing capability of the print providers and establish a first subset of the print providers based on the first match, query the first subset of the print providers on the performance attribute of the pint job and receive a response thereto, and perform a second match of the parameter of the performance attribute with the response thereto and establish a second subset of the print providers based on the second match, and
wherein the print brokering system controller is adapted to compile a list of the second subset of the print providers which has the printing capability to fulfill the print request and matches the performance attribute of the print job, and wherein the print brokering system controller is adapted to present the list to the customer, wherein the list excludes print providers which do not have the printing capability to fulfill the print request.

17. The system of claim 16, further comprising:
a print provider interface configured to communicate with the print brokering system controller via a network communication link to transmit the printing capability of each of the print providers to the print brokering system controller.

18. The system of claim 17, wherein the network communication link is an Internet communication link.

19. The system of claim 17, wherein the print provider interface includes at least one of a file format options field, a print medium options field, a printing layout options field, a color printing options field, a finishing options field, a delivery options field, and a print provider identification field.

20. The system of claim 16, wherein the printing capability of each of the print providers includes at least one of a file format compatibility, a print medium capability, a printing layout capability, a color printing capability, a finishing capability, a delivery capability, and an identification of each of the print providers.

21. The system of claim 16, further comprising:
a print brokering data storage system configured to communicate with the print brokering system controller and store a registration of the printing capability of each of the print providers therein.

22. The system of claim 16, further comprising:
a customer interface configured to communicate with the print brokering system controller via a network communication link to transmit the print request for the print job to the print brokering system controller.

23. The system of claim 22, wherein the network communication link is an Internet communication link.

24. The system of claim 22, wherein the customer interface includes at least one of a file format field, a number of copies field, a print medium field, a printing layout field, a color printing option field, a finishing option field, a delivery option field, and a customer identification field.

25. The system of claim 16, wherein the print request includes at least one of a file format, a number of copies, a print medium, a printing layout, a color printing option, a finishing option, a delivery option, and an identification for the print job.

26. The system of claim 16, wherein the first subset of the print providers is one of less than the plurality print providers and equal to the plurality of print providers.

27. The system of claim 26, wherein the second subset of the print providers is one of less than the first subset of the print providers and equal to the first subset of the print providers.

28. The system of claim 16, wherein the performance attribute of the print job includes at least one of a price of the print job, an availability to complete the print job, and a turnaround time for completing the print job.

29. The system of claim 16, wherein the print brokering system controller is adapted to rank the second subset of the print providers based on the performance attribute of the print job.

30. The system of claim 16, wherein the print brokering system controller is adapted to rank the second subset of the print providers based on at least one attribute of the print request.

31. The system of claim 16, wherein the print brokering system controller is adapted to present the list of the second subset of the print providers to the customer via a network communication link.

32. The system of claim 31, wherein the network communication link is an Internet communication link.

33. A method of brokering a print job between a customer and a plurality of print providers, the method comprising:

providing a print brokering system controller having a printing capability of the print providers registered therewith;

generating and submitting a print request for the print job to the print brokering system controller, including submitting a parameter of a performance attribute of the print job;

comparing via the print brokering system controller the print request with the printing capability of the print providers and determining which of the print providers have the printing capability to fulfill the print request, including performing a first match of the print request with the printing capability of the print providers and establishing a first subset of the print providers based on the first match, querying the first subset of the print providers on the performance attribute of the print job and receiving a response thereto, and performing a second match of the parameter of the performance attribute with the response thereto and establishing a second subset of the print providers based on the second match;

compiling via the print brokering system controller a list including only the second subset of print providers which have the printing capability to fulfill the print request and match the performance attribute of the print job; and presenting the list to the customer.

34. The method of claim 33, further comprising:

defining an Internet communication link between the customer and the print brokering system controller, wherein generating and submitting the print request includes generating and submitting the print request for the print job to the print brokering system controller via the Internet communication link, and wherein presenting the list of print providers includes presenting the list of print providers to the customer via the Internet communication link.

35. The method of claim 34, wherein defining the Internet communication link includes defining the Internet communication link between the customer, the print providers, and the print brokering system controller, and further comprising:

selecting at least one print provider of the second subset of the print providers to fulfill the print job; and submitting the print job to the at least one print provider via the Internet communication link.

36. The method of claim 35, further comprising:

registering the printing capability of the print providers with the print brokering system via the Internet communication link, including registering at least one of a file format compatibility, a print medium capability, a printing layout capability, a color printing capability, a finishing capability, a delivery capability, and an identification of the print providers.

37. The method of claim 33, wherein generating and submitting the print request includes specifying at least one of a file format, a number of copies, a print medium, a printing layout, a color printing option, a finishing option, a delivery option, and a customer identification for the print job.

38. The method of claim 33, wherein the performance attribute of the print job includes at least one of a price of the print job, an availability to complete the print job, and a turnaround time for completing the print job.

* * * * *

UNITED STATES PATENT AND TRADEMARK OFFICE
CERTIFICATE OF CORRECTION

| | | |
|---|---|---|
| PATENT NO. | : 7,042,585 B1 | Page 1 of 1 |
| APPLICATION NO. | : 09/686849 | |
| DATED | : May 9, 2006 | |
| INVENTOR(S) | : Michael Dean Whitmarsh et al. | |

It is certified that error appears in the above-identified patent and that said Letters Patent is hereby corrected as shown below:

In column 13, line 52, in Claim 16, delete "pint" and insert -- print --, therefor.

In column 14, line 42, in Claim 26, after "less than the plurality" insert -- of --.

Signed and Sealed this

Fourth Day of August, 2009

JOHN DOLL
*Acting Director of the United States Patent and Trademark Office*